United States Patent
Tang et al.

(10) Patent No.: US 10,742,532 B2
(45) Date of Patent: Aug. 11, 2020

(54) NON-INTRUSIVE MECHANISM TO MEASURE NETWORK FUNCTION PACKET PROCESSING DELAY

(71) Applicant: Futurewei Technologies, Inc., Plano, TX (US)

(72) Inventors: Yewei Tang, Santa Clara, CA (US); Ulas Can Kozat, Mountain View, CA (US); Hang Shi, Fremont, CA (US); Yinghua Ye, Los Gatos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 226 days.

(21) Appl. No.: 15/845,163

(22) Filed: Dec. 18, 2017

(65) Prior Publication Data

US 2019/0190804 A1   Jun. 20, 2019

(51) Int. Cl.
*G06F 15/16* (2006.01)
*H04L 12/26* (2006.01)

(52) U.S. Cl.
CPC ........ *H04L 43/0852* (2013.01); *H04L 43/106* (2013.01); *H04L 43/022* (2013.01);
(Continued)

(58) Field of Classification Search
CPC .. H04N 19/105; H04N 19/117; H04N 19/132; H04N 19/157; H04N 19/164;
(Continued)

(56) References Cited

U.S. PATENT DOCUMENTS 6,360,271 B1 * 3/2002 Schuster ............... H04J 3/0632
370/516
6,611,537 B1 * 8/2003 Edens ................. H04L 12/2803
348/E7.05
(Continued)

FOREIGN PATENT DOCUMENTS

| CN | 104869023 A | 8/2015 |
| CN | 105099789 A | 11/2015 |
| CN | 105530116 A | 4/2016 |

OTHER PUBLICATIONS

"International Application No. PCT/CN2018/121700, International Search Report and Written Opinion dated Mar. 15, 2019", (dated Mar. 15, 2019), 9 pgs.

*Primary Examiner* — Moustafa M Meky
*Assistant Examiner* — Thorne E Waugh
(74) *Attorney, Agent, or Firm* — Schwegman Lundberg & Woessner, P.A.

(57) ABSTRACT

A network device performs operations comprising: receiving a first plurality of data packets, each data packet of the first plurality of data packets including a checksum value, and storing the checksum values of a subset of the first plurality of data packets along with a first timestamp; providing the first plurality of data packets to a network function (NF); receiving, from the NF, a second plurality of data packets generated by the NF in response to the first plurality of data packets, each data packet of the second plurality of data packets including a checksum value; storing a second timestamp when checksum values of a subset of the second plurality of data packets match the stored checksum values; and generating telemetry data based on the first timestamp and the second timestamp.

25 Claims, 11 Drawing Sheets

(52) U.S. Cl.
CPC .............. *H04L 43/04* (2013.01); *H04L 43/06* (2013.01); *H04L 43/0894* (2013.01)

(58) Field of Classification Search
CPC .. H04N 19/174; H04N 19/176; H04N 19/426; H04N 19/436; H04N 19/55; H04N 19/593; H04N 19/70; H04N 19/82; H04L 43/022; H04L 43/04; H04L 43/06; H04L 43/0852; H04L 43/0894; H04L 43/106
See application file for complete search history.

(56) References Cited

U.S. PATENT DOCUMENTS

| | | | |
|---|---|---|---|
| 7,519,006 B1* | 4/2009 | Wing | H04L 29/06027 370/252 |
| 9,560,078 B2 | 1/2017 | Sood et al. | |
| 9,787,559 B1* | 10/2017 | Schroeder | H04L 41/5038 |
| 10,142,210 B2* | 11/2018 | Sufleta | H04L 43/106 |
| 10,148,796 B2* | 12/2018 | Wang | H04L 1/0061 |
| 2008/0187009 A1* | 8/2008 | Kim | H04H 20/67 370/517 |
| 2012/0207178 A1* | 8/2012 | Webb | H04L 47/365 370/429 |
| 2017/0111483 A1* | 4/2017 | Wang | H04L 1/0061 |
| 2017/0141989 A1* | 5/2017 | Sufleta | H04L 43/106 |
| 2017/0155662 A1 | 6/2017 | Courbon et al. | |
| 2018/0081714 A1 | 3/2018 | Liu | |
| 2018/0191561 A1 | 7/2018 | You | |
| 2018/0227231 A1* | 8/2018 | Ravuri | H04L 43/0852 |
| 2018/0227349 A1* | 8/2018 | Annamraju | H04L 43/0858 |
| 2019/0068470 A1* | 2/2019 | Mirsky | H04L 41/5009 |

\* cited by examiner

400

| | TELEMETRY TABLE | | |
|---|---|---|---|
| | CHECKSUM 410 | EGRESS TIMESTAMP 420 | INGRESS TIMESTAMP 430 |
| 440A | 41118 | 2017-09-28 10:03.3378 | 2017-09-28 10:03.3422 |
| 440B | 28632 | 2017-09-28 10:03.4704 | 2017-09-28 10:03.4758 |
| 440C | 13279 | 2017-09-28 10:03.8104 | 2017-09-28 10:03.8162 |

FIG. 4

NON-INTRUSIVE MECHANISM TO MEASURE NETWORK FUNCTION PACKET PROCESSING DELAY

TECHNICAL FIELD

The present disclosure is related to measuring packet processing delay of network functions and, in one particular embodiment, to a non-intrusive mechanism to measure a network function packet processing delay.

BACKGROUND

In a network, network devices receive and transmit data packets to allow the data packets to reach their specified destinations. Most data packets sent over the Internet use the Internet Protocol (IP). Many IP packets use the transmission control protocol (TCP) or the user datagram protocol (UDP) at the transport layer. A network device is any device that receives and retransmits data packets in a network. Example network devices include routers, switches, soft routers, and soft switches.

Network devices include network functions (NFs) and/or virtual network functions (VNFs) to properly process and route received data packets. An NF is implemented in hardware, either in a network device or in another device connected to the network device. A VNF is implemented in software, either in the network device or in another device accessible from the network device. As used herein, the term NF encompasses both hardware- and software-implemented network functions, unless expressly stated otherwise. By way of example, in a fourth-generation (4G) long-term evolution (LTE) evolved packet core (EPC) system, a serving gateway/packet data network (PDN) gateway (SPGW) may perform deep packet inspection (DPI) on data packets using an NF. In this example, a user plane of a network device (e.g., the switching/routing part of the network device) forwards data packets to the NF. After the NF finishes the DPI of each packet, it returns the packet back to the SPGW user plane, which forwards the packets to their next hop.

To debug NFs, network statistics, such as packet counts and pass-through rates on ports or logic interfaces, are collected (e.g., via simple network management protocol (SNMP), syslog, or command-line interface (CLI) pull) and used to monitor and analyze network performance In-band network telemetry (INT) adds a timestamp or other kind of tag in packet metadata. The tag is injected into the packet metadata at an ingress interface of a network device. The metadata travels with the packet in buffers, queues, and processing units. The metadata enables latency to be measured along each step of the data path. Telemetry data, as used herein, refers to data that measures a quantity that is relevant to network performance.

Data may also be gathered by sending through additional packets for testing. For example, a data packet containing a timestamp of its creation time as a payload may be sent from a first test machine to a second test machine to measure total propagation time through a network.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

According to one aspect of the present disclosure, there is provided a network device that comprises a memory storage comprising instructions; and one or more processors in communication with the memory, wherein the one or more processors execute the instructions to perform operations comprising: receiving a first plurality of data packets, each data packet of the first plurality of data packets including a checksum value, and storing the checksum values of a subset of the first plurality of data packets along with a first timestamp; providing the first plurality of data packets to a network function (NF); receiving, from the NF, a second plurality of data packets generated by the NF in response to the first plurality of data packets, each data packet of the second plurality of data packets including a checksum value; storing a second timestamp when checksum values of a subset of the second plurality of data packets match the stored checksum values; and generating telemetry data based on the first timestamp and the second timestamp.

Optionally, in any of the preceding embodiments, the network device further comprises a network interface in communication with the one or more processors, wherein the one or more processors further execute the instructions to perform receiving, via the network interface, the first plurality of data packets, each data packet of the first plurality of data packets including a corresponding checksum value.

Optionally, in any of the preceding embodiments, the network device further comprises a network interface in communication with the one or more processors, wherein the one or more processors further execute the instructions to transmit the telemetry data via the network interface.

Optionally, in any of the preceding embodiments, the subset of the first plurality of data packets is a sequential subset of a predetermined number of data packets.

Optionally, in any of the preceding embodiments, the predetermined number of data packets is three data packets.

Optionally, in any of the preceding embodiments, the operations further comprise: determining the predetermined number of data packets based on a network speed of a network connected to the network interface.

Optionally, in any of the preceding embodiments, the NF is a virtual network function (VNF).

Optionally, in any of the preceding embodiments, the operations further comprise: selecting the subset of the first plurality of data packets based on a predetermined sampling rate.

Optionally, in any of the preceding embodiments, the operations further comprise: selecting the subset of the first plurality of data packets based on a predetermined sampling size.

Optionally, in any of the preceding embodiments, the operations further comprise: selecting the subset of the first plurality of data packets based on a predetermined sampling time.

Optionally, in any of the preceding embodiments, the operations further comprise: receiving a network address to send the telemetry data to; and the sending of the telemetry data via the network interface comprises sending the telemetry data to the received network address.

Optionally, in any of the preceding embodiments, the telemetry data comprises a latency of the NF; and the operations further comprise: based on the latency of the NF and a predetermined threshold, starting a virtual machine to run an additional copy of the NF.

According to one aspect of the present disclosure, there is provided a computer-implemented method of non-intrusively measuring network function (NF) packet processing delay, comprising: receiving, by one or more processors, a first plurality of data packets, each data packet of the first plurality of data packets including a checksum value, and storing the checksum values of a subset of the first plurality of data packets along with a first timestamp; providing, by the one or more processors, the first plurality of data packets to a network function (NF); receiving, by the one or more processors and from the NF, a second plurality of data packets generated by the NF in response to the first plurality of data packets, each data packet of the second plurality of data packets including a checksum value; storing, by the one or more processors, a second timestamp when checksum values of a subset of the second plurality of data packets match the stored checksum values; and generating, by the one or more processors, telemetry data based on the first timestamp and the second timestamp.

Optionally, in any of the preceding embodiments, the method further comprises receiving, via a network interface, the first plurality of data packets, each data packet of the first plurality of data packets including a corresponding checksum value.

Optionally, in any of the preceding embodiments, the method further comprises transmitting the telemetry data via a network interface.

Optionally, in any of the preceding embodiments, the subset of the first plurality of data packets is a sequential subset of a predetermined number of data packets.

Optionally, in any of the preceding embodiments, the predetermined number of data packets is three data packets.

Optionally, in any of the preceding embodiments, the method further comprises: determining the predetermined number of data packets based on a network speed of a network connected to the network interface.

Optionally, in any of the preceding embodiments, the NF is a virtual network function (VNF).

Optionally, in any of the preceding embodiments, the method further comprises: selecting the subset of the first plurality of data packets based on a predetermined sampling rate.

Optionally, in any of the preceding embodiments, the method further comprises: selecting the subset of the first plurality of data packets based on a predetermined sampling size.

Optionally, in any of the preceding embodiments, the method further comprises: selecting the subset of the first plurality of data packets based on a predetermined sampling time.

Optionally, in any of the preceding embodiments, the method further comprises: receiving a network address to send the telemetry data to; and the sending of the telemetry data via the network interface comprises sending the telemetry data to the received network address.

Optionally, in any of the preceding embodiments, the method further comprises: the telemetry data comprises a latency of the NF; and the operations further comprise: based on the latency of the NF and a predetermined threshold, starting a virtual machine to run an additional copy of the NF.

According to one aspect of the present disclosure, there is provided a non-transitory computer-readable medium storing computer instructions for non-intrusively measuring network function (NF) packet processing delay, that when executed by one or more processors of a network device, cause the one or more processors to perform steps of: receiving a first plurality of data packets, each data packet of the first plurality of data packets including a checksum value, and storing the checksum values of a subset of the first plurality of data packets along with a first timestamp; receiving, from a network function (NF), a second plurality of data packets generated by the NF in response to the first plurality of data packets, each data packet of the second plurality of data packets including a checksum value; storing a second timestamp when checksum values of a subset of the second plurality of data packets match the stored checksum values; and generating telemetry data based on the first timestamp and the second timestamp.

Any one of the foregoing examples may be combined with any one or more of the other foregoing examples to create a new embodiment within the scope of the present disclosure.

BRIEF DESCRIPTION OF THE DRAWINGS

FIG. 4 is a block diagram illustration of a database schema useful in methods of non-intrusively measuring a network function packet processing delay, according to some example embodiments.

DETAILED DESCRIPTION

Figure 1:
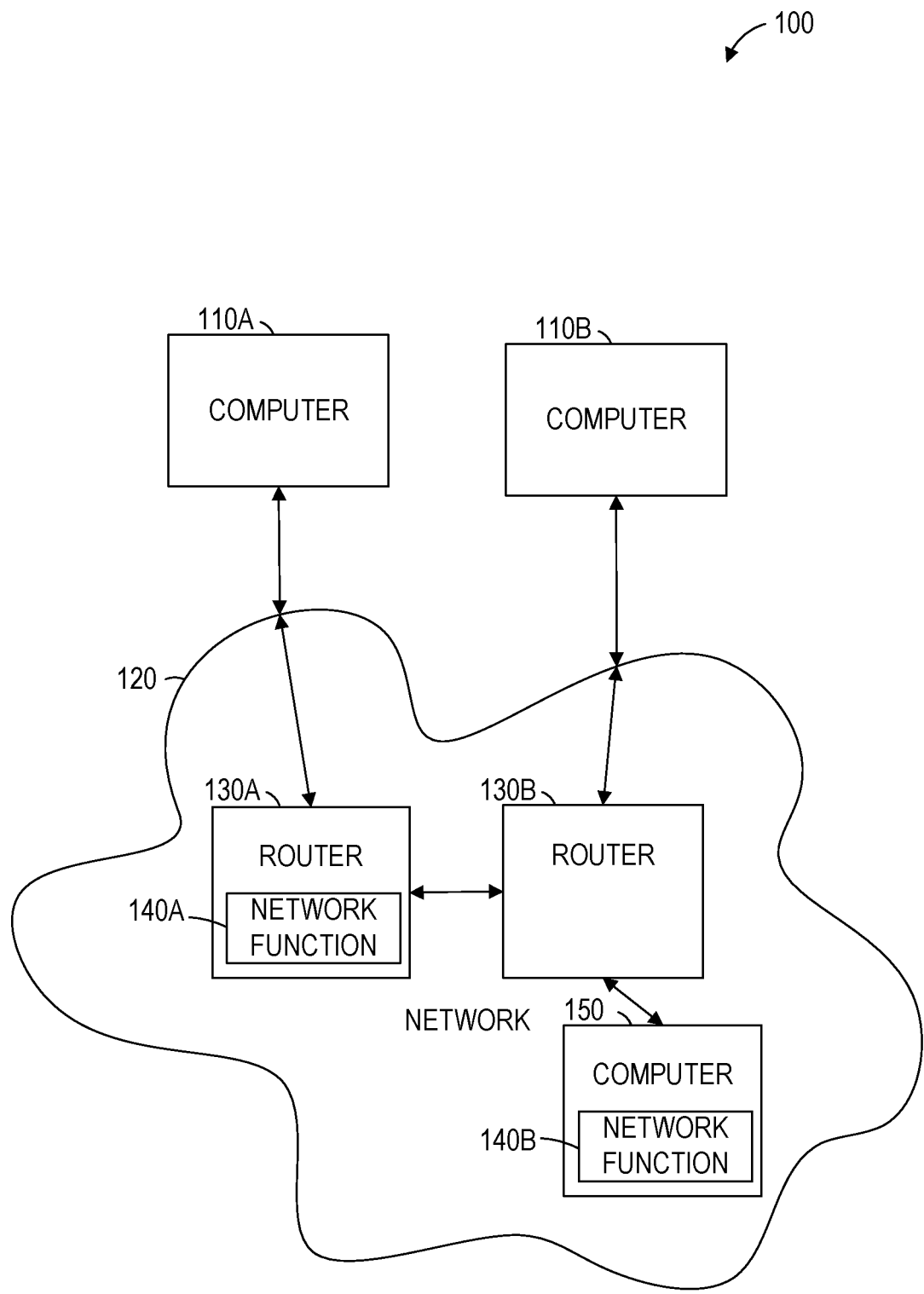
FIG. 1 is an illustration of an example network organization for non-intrusively measuring a network function packet processing delay, according to some example embodiments.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a network device, digital signal processor, application-specific integrated circuit (ASIC), programmable data plane chip, field-programmable gate array (FPGA), microprocessor, or other type of processor operating on a computer system, turning such a computer system into a specifically programmed machine.

Packet round-trip latency in an NF is the time the packet spends being processed by the NF. The packet round-trip latency in the NF can be determined by subtracting the time at which the packet is transmitted to the NF from the time at which the packet is received from the NF. The time at which the packet is transmitted to the NF may be slightly earlier than the time at which the packet enters the NF. Similarly, the time at which the packet is received from the NF may be slightly later than the time at which the packet exits the NF. In some example embodiments, these time differences are fixed, are much smaller than the time spent in the NF (e.g., less than 1% of the NF time), and are ignored. In other example embodiments, these time differences are predicted and subtracted from the resulting packet round-trip latency.

A network device may determine packet round-trip latency in an NF by storing the time at which the packet entered the NF, recognizing the packet as it exits the NF, and determining the difference between the two times. One method of recognizing the packet as it exits the NF is to modify the packet to include a unique identifier (e.g., a 64-bit timestamp). Without modifying the packet to include a unique identifier, the network device may encounter multiple packets that are identical, resulting in conflating the packets. To avoid this, multiple packets in sequence may be recognized, reducing the chances of error due to the lower chance of the precise sequence being duplicated.

In some example embodiments, an existing 16-bit checksum value from each packet for which the network device is determining the round-trip latency is stored in a database of the network device. By recognizing that a sequence of packets exiting the NF had the same sequence of 16-bit values as a sequence of packets entering the NF, the network device may determine with a high degree of certainty that the exiting packets correspond to the entering packets. As a result, the time elapsed between the time at which the sequence of packets entered the NF and the time at which the sequence of packets exited the NF is the packet round-trip latency for each packet in the sequence. The measured latency may be reported to an administrator. Additionally or alternatively, if the measured latency exceeds a predetermined threshold, remedial action may be taken, such as launching a new virtual machine to run an additional copy of the NF.

By storing and checking the 16-bit checksum values stored in the processed packets to determine when a sequence of packets provided to an NF have been returned from the NF, the network device measures the latency of the NF without modifying the data stream. In comparison with existing means of measuring NF latency that add diagnostic packets to the data stream, this reduces the impact on network traffic of measuring latency.

FIG. 1 is an illustration of an example network organization 100 for non-intrusively measuring a network function packet processing delay, according to some example embodiments.

The example network organization 100 includes computers 110A and 110B communicating via a network 120. The network 120 includes routers 130A and 130B and a computer 150. The router 130A includes an NF 140A, and the computer 150 includes an NF 140B. The routers 130A-130B may be referred to collectively as routers 130 or generically as a router 130. The NFs 140A-140B may be referred to collectively as NFs 140 or generically as an NF 140. The computers 110A-110B may be referred to collectively as computers 110 or generically as a computer 110.

Data packets sent from the computer 110A to the computer 110B via the network 120 traverse one or more routers 130. During processing by a router 130, the data packet may be processed by one or more NFs 140. The NF 140 may be implemented in a router, as the NF 140A is implemented in the router 130A. Alternatively, the NF 140 may be implemented in a separate hardware device external to the router 130, as the NF 140B is implemented in the computer 150, connected to the router 130B within the network 120. The NF 140 may be implemented in hardware (e.g., an ASIC or FPGA) or software (e.g., using a memory that stores instructions that are executed by one or more processors of a router 130 or the computer 150). Though only one NF is shown as being associated with each of the routers 130, the use of multiple NFs is also contemplated.

The routers 130 may collect telemetry information regarding the traffic flowing through the network 120. The telemetry information may be accessed via the network 120 (e.g., using a file transfer protocol (FTP) or hypertext transport protocol (HTTP) interface).

Although the connections between the computers 110, the network 120, the routers 130, and the computer 150 are shown as bidirectional, unidirectional connections are also possible. For example, instead of bidirectional cables carrying bidirectional data, pairs of unidirectional cables may be used. As another example, pairs of bidirectional cables may be used, with each cable carrying unidirectional data despite having bidirectional capability.

Figure 2:
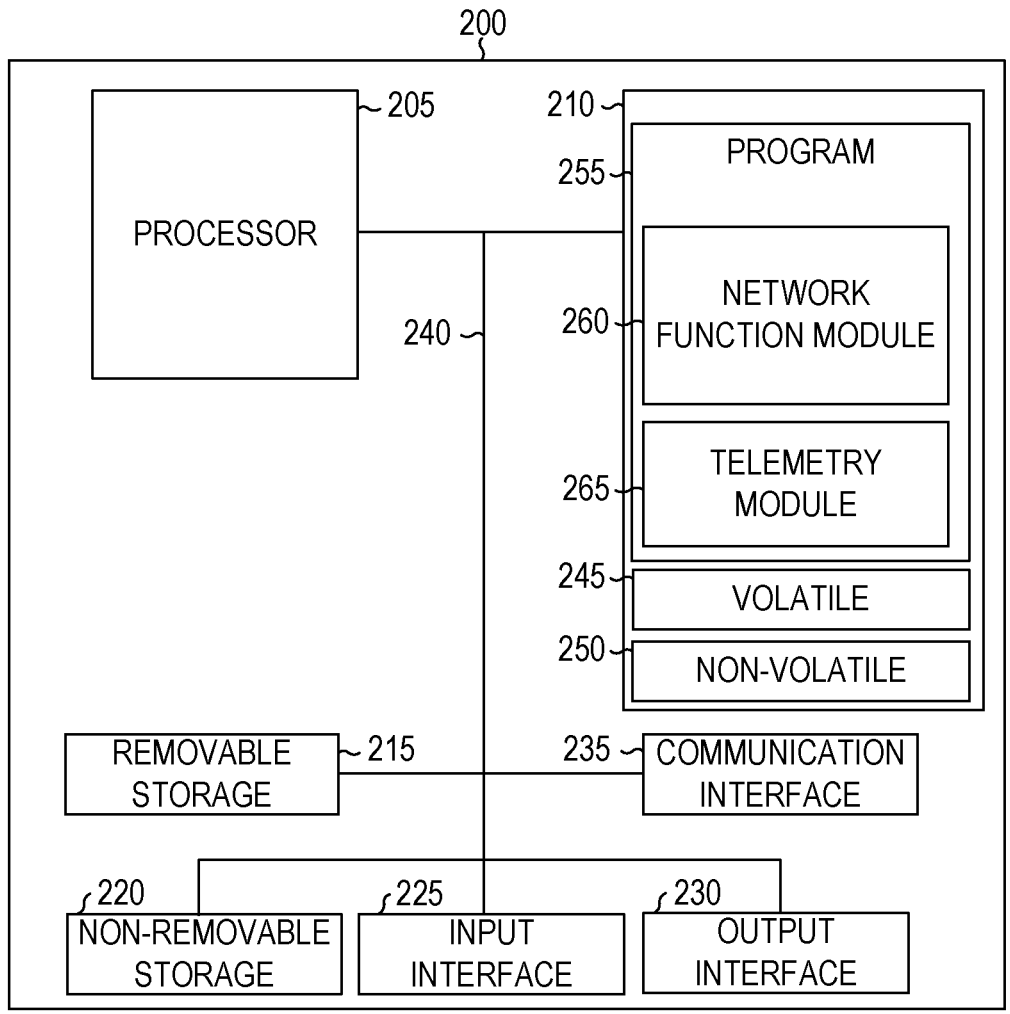
FIG. 2 is a block diagram illustrating circuitry for a network device that implements algorithms and performs methods, according to some example embodiments.

FIG. 2 is a block diagram illustrating circuitry for a network device that implements algorithms and performs methods, according to example embodiments. All components need not be used in various embodiments. For example, clients, servers, autonomous systems, network devices, and cloud-based network resources may each use a different set of components, or, in the case of servers for example, larger storage devices.

One example computing device in the form of a network device 200 (also referred to as a computer 200, a computing device 200, and/or a computer system 200) may include a processor 205, memory storage 210, removable storage 215, and non-removable storage 220, all connected by a bus 240. Although the example computing device is illustrated and described as the computer 200, the computing device may be in different forms in different embodiments. For example, the computing device may instead be a smartphone, a tablet, a smartwatch, or another computing device including elements the same as or similar to those illustrated and described with regard to FIG. 2. Devices such as smartphones, tablets, and smartwatches are generally collectively referred to as "mobile devices" or "user equipment." Further, although the various data storage elements are illustrated as part of the computer 200, the storage may also or alternatively include cloud-based storage accessible via a network, such as the Internet, or server-based storage.

The memory storage 210 may include volatile memory 245 and/or non-volatile memory 250, and may store a program 255. The computer 200 may include, or have access to a computing environment that includes, a variety of computer-readable media, such as the volatile memory 245, the non-volatile memory 250, the removable storage 215, and/or the non-removable storage 220. Computer storage includes random-access memory (RAM), read-only memory (ROM), erasable programmable read-only memory (EPROM), electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 200 may include or have access to a computing environment that includes an input interface 225, an output interface 230, and a communication interface 235. The output interface 230 may interface to or include a display device, such as a touchscreen, that also may serve as an input device. The input interface 225 may interface to or include one or more of a touchscreen, a touchpad, a mouse, a keyboard, a camera, one or more device-specific buttons, one or more sensors integrated within or coupled via wired or wireless data connections to the computer 200, and other input devices. The computer 200 may operate in a networked environment using the communication interface 235 to connect to one or more remote computers, such as database servers. The remote computer may include a personal computer (PC), server, router, switch, network PC, peer device or other common network node, or the like. The communication interface 235 may connect to a local-area network (LAN), a wide-area network (WAN), a cellular network, a WiFi network, a Bluetooth network, or other networks.

Though the computer 200 is shown as having a single one of each element 205-265, multiples of each element may be present. For example, multiple processors 205, multiple input interfaces 225, multiple output interfaces 230, and/or multiple communication interfaces 235 may be present. In some example embodiments, different communication interfaces 235 are connected to different networks.

Computer-readable instructions stored on a computer-readable medium (e.g., the program 255 stored in the memory storage 210) are executable by the processor 205 of the computer 200. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 255 is shown as including an NF module 260 and a telemetry module 265. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The NF module 260 provides data packets to one or more NFs and receives data packets from the one or more NFs. For example, each data packet received by the network device 200 from the communication interface 235 may be provided to a first NF for processing, each data packet received from the first NF may be provided to a second NF, each data packet received from the second NF may be provided to a third NF, and each data packet received from the third NF may be transmitted by the network device 200 using the communication interface 235. In some example embodiments, data packets are provided by the NF module 260 to an NF only when certain criteria are met. For example, a particular NF may be invoked only for packets having particular values in a tunnel header 310, an IP header 320, or a TCP/UDP header 330 (described below with respect to FIG. 3).

The telemetry module 265 records identifying data for one or more data packets prior to the providing, by the NF module 260, of the data packets to an NF. The telemetry module 265 uses the recorded identifying data to recognize when the one or more data packets are returned from the NF and stores telemetry data based on the ingress and egress times. For example, the time spent by the data packets may be stored, a number of data packets processed by the NF in a predetermined period of time (e.g., one second) may be stored, an amount of data processed by the NF in the predetermined period of time may be stored, or any suitable combination thereof.

Figure 3:
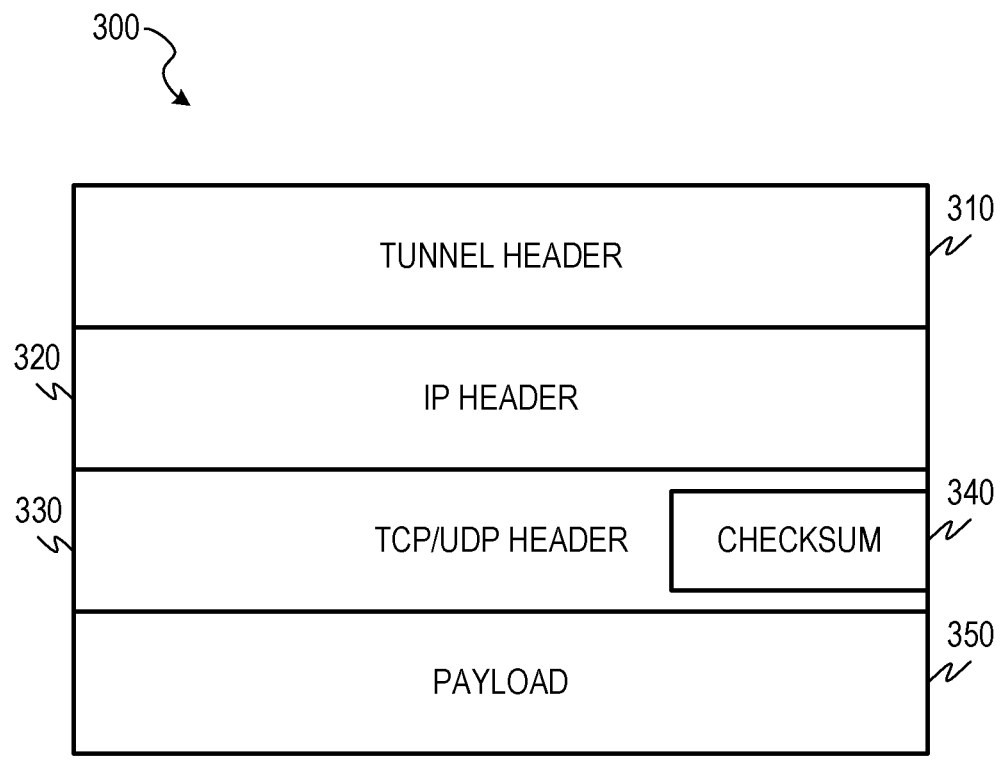
FIG. 3 is a block diagram illustration of a network packet data structure useful in methods of non-intrusively measuring a network function packet processing delay, according to some example embodiments.

FIG. 3 is a block diagram illustration of a network packet data structure 300 useful in methods of non-intrusively measuring a network function packet processing delay, according to some example embodiments. The data structure 300 includes a tunnel header 310, an IP header 320, a TCP/UDP header 330, a checksum 340, and a payload 350.

The tunnel header 310 includes header information for IP communications between two networks. In some example embodiments, the tunnel header 310 is a second IP header that encapsulates the IP header 320. The IP header 320 includes information regarding IP version, source IP address, and destination IP address. The TCP/UDP header 330 includes information regarding the transport layer, such as source port, destination port, and sequence number. The checksum 340, though shown as being embedded in the TCP/UDP header 330, may be separate from the headers 310-330, or may be embedded in one of the headers 310-320. In some example embodiments, the checksum 340 is a 16-bit value. The payload 350 includes application data being sent from the source IP address to the destination IP address.

FIG. 4 is a block diagram illustration of a database schema useful in methods of non-intrusively measuring a network function packet processing delay, according to some example embodiments. The database schema of FIG. 4 includes a telemetry table 400. The telemetry table 400 includes a checksum field 410, an egress timestamp field 420, and an ingress timestamp field 430. Rows 440A, 440B, and 440C of the telemetry table 400 are shown.

Each of the rows 440A-440C stores information for a data packet. The checksum field 410 stores the checksum (e.g., the checksum 340) for the data packet. The egress timestamp field 420 stores a timestamp of the time at which the data packet was provided to an NF. The ingress timestamp field 430 stores a timestamp of the time at which the data packet was received from the NF. The difference between the values of the ingress timestamp field 430 and the egress timestamp field 420 is the latency of the NF. In some example embodiments, an additional field that identifies the NF is present in the telemetry table 400.

Figure 5:
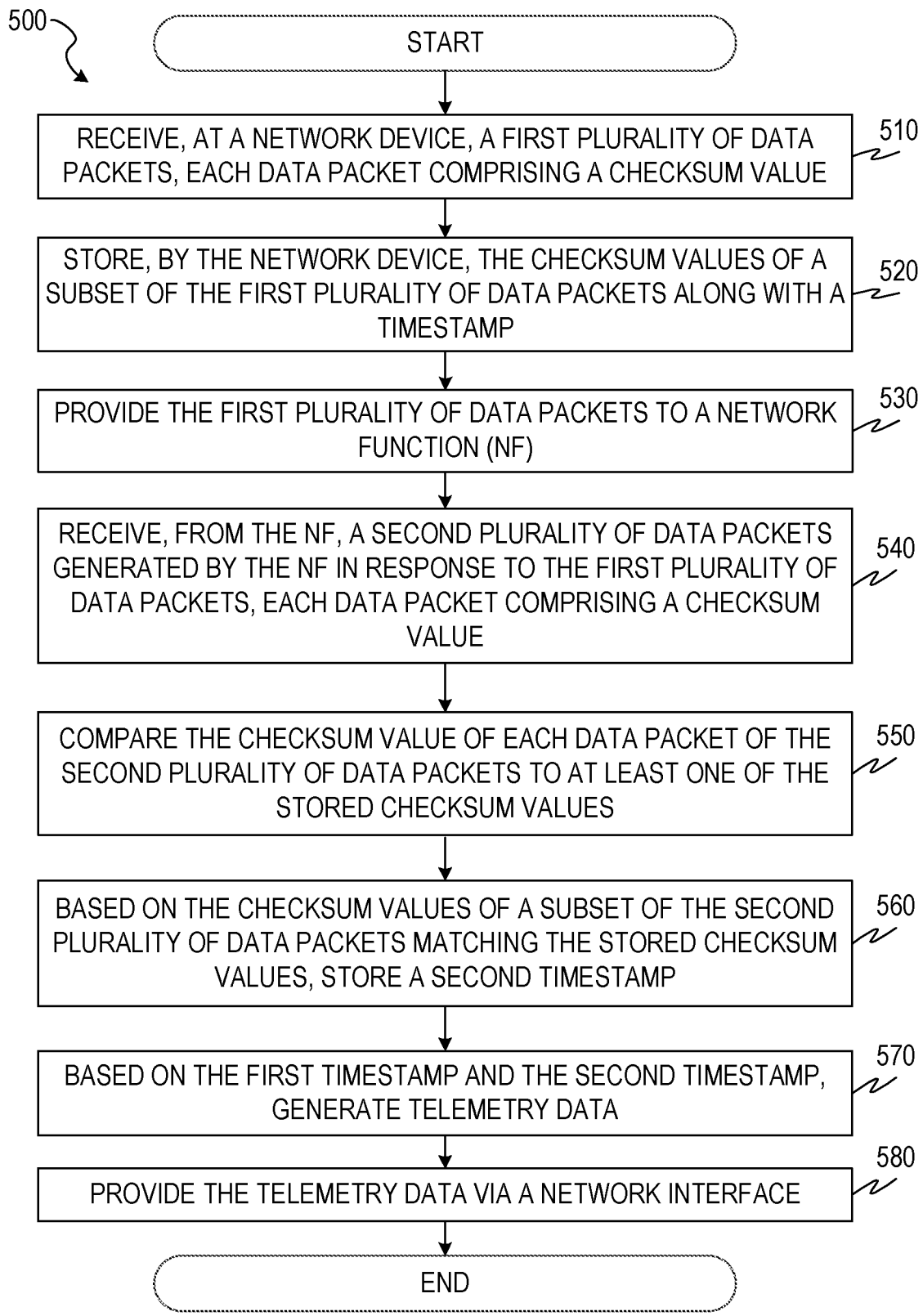
FIG. 5 is a flowchart illustration of a method of non-intrusively measuring a network function packet processing delay, according to some example embodiments.

FIG. 5 is a flowchart illustration of a method 500 of non-intrusively measuring a network function packet processing delay, according to some example embodiments. The method 500 includes operations 510, 520, 530, 540, 550, 560, 570, and 580. By way of example and not limitation, the method 500 is described as being performed by elements of the network organization 100, described above with respect to FIG. 1, and the network device 200, described above with respect to FIG. 2.

In operation 510, the communication interface 235 of the network device 200 receives a first plurality of data packets. Each received data packet comprises a checksum value. For example, data packets using the data structure 300, including the checksum 340, may be received.

In operation 520, the telemetry module 265 of the network device 200 stores the checksum values of a subset of the first plurality of data packets along with a timestamp (e.g., a single timestamp for the subset of data packets or a timestamp for each data packet of the subset of data packets). For example, one row may be added to the telemetry table 400 for each data packet in the subset of the first plurality of data packets, with the egress timestamp field 420 populated with the time at which the row is added. The subset of the first plurality of data packets may comprise a predetermined number of sequential data packets (e.g., three sequential data packets). The predetermined number of data packets may be selected based on a network speed of the network connected to a network interface of the network device. For example, a network device operating on a higher-speed network will process more packets in a period of time than a network device operating on a lower-speed network. Processing more packets increases the likelihood of encountering two different packets with the same checksum value. Storing the checksum values of a set of sequential data packets effectively increases the size of the checksum value for the set, thus reducing the likelihood of erroneously identifying another set of data packets as being the set for which the checksum values were stored.

The selection of the subset of the first plurality of data packets may be based on a predetermined sampling rate, a predetermined sampling size, a predetermined sampling time, a predetermined sampling duration, or any suitable combination thereof. A predetermined sampling rate refers to a selection of a percentage of packets received by the network device (e.g., 0.1%). A predetermined sampling size refers to a selection of a predetermined number of sequential packets when selection occurs (e.g., selection of three data packets at a time). A predetermined sampling time refers to a selection of packets at predetermined time intervals (e.g., selection of packets once every second). A predetermined sampling duration refers to a selection of a time period during which sampling will occur (e.g., selection of packets according to the predetermined sampling rate, sampling size, and sampling time for one hour or one day).

A 16-bit TCP checksum value has 65,536 different potential values. Even when every packet has a unique value until all possible values are used, the 65,536 values will be consumed within about 50 Mb of data. Thus, in a 5G mobile network, supporting up to 1 Gbps of data per user, checksum collisions are inevitable within a one-second sampling period. However, for three consecutive packets, the resulting 48-bit value has 281, 474, 976, 710, 656 unique potential values, more than sufficient to support 5G data rates with a very low probability of mistakenly identifying a sequence of three packets.

In example embodiments that lack checksum values, the telemetry module 265 may perform a hash on a portion of each data packet that is known to be unchanged by the NF. The hash value may be used in the manner of the checksum as described throughout the specification. Packet flow filtering may be used to make sure the packets for which telemetry information is stored are going out to the NF and coming back from the NF in the same order. Flow identification may be done by storing a 5-tuple from the packet header (e.g., the source IP address, source port, destination IP address, destination port, and checksum) and confirming that the data packets returned by the NF match those provided.

The telemetry module 265 may check the checksum value to confirm validity before storing it. For example, some applications may set the checksum value to 0 rather than computing the checksum value as a function of the TCP/UDP header and data payload. For example, following standard protocol definitions, TCP packets must have a valid checksum value, but the checksum value is optional for UDP packets. Under these circumstances, the telemetry module 265 may calculate the checksum value for a data packet (e.g., a UDP packet), modify the data packet to include the calculated checksum value, and store the calculated checksum value in a database for later comparison.

In operation 530, the NF module 260 of the network device 200 provides the first plurality of data packets to an NF. For example, the NF 140A of the router 130A may be invoked for each data packet in the first plurality of data packets.

In operation 540, the NF module 260 of the network device 200 receives, from the NF, a second plurality of data packets generated by the NF in response to the first plurality of data packets. Each received data packet comprises a checksum value. In some example embodiments, the NF does not change the data structure of the data packets. In other example embodiments, the NF changes the data structure of the data packets (e.g., by popping a tunnel header) but in a way that does not affect the TCP/UDP checksum (e.g., by not affecting the payload or TCP/UDP header used to determine the checksum).

In operation 550, the telemetry module 265 of the network device 200 compares the checksum value of each data packet of the second plurality of data packets to at least one of the stored checksum values. For example, the checksum value of the row 440A may be compared to the checksum value of each data packet until a match is found. The checksum value of the data packet after the data packet with the matching checksum is compared to the checksum value of the row 440B. If the second checksum matches, the checksum value of the data packet after the second data packet with the matching checksum is compared to the checksum value of the row 440C. Otherwise, the checksum value of the data packet after the second data packet with the matching checksum is compared to the checksum value of the row 440A and the process of attempting to find sequential matches is restarted.

In operation 560, based on the checksum values of a subset of the second plurality of data packets matching the stored checksum values, the telemetry module 265 of the network device 200 stores a second timestamp. For example, the rows 440A-440C may be updated to add values in the ingress timestamp field 430 that indicate the time at which the subset of the second plurality of data packets was received by the network device from the NF. In some example embodiments, the ingress timestamp field 430 is populated with the same value for each data packet in the second plurality of data packets (e.g., with the timestamp at which the last data packet in the second plurality of data packets was received). In other example embodiments, the ingress timestamp field 430 is populated with a different value for each data packet in the second plurality of data packets (e.g., with time timestamp at which the data packet having the indicated checksum was received).

In operation 570, the telemetry module 265 of the network device 200 generates telemetry data based on the first timestamp and the second timestamp (e.g., determines the latency of the NF), and, in operation 580, the telemetry module 265 of the network device 200 provides the telemetry data via a network interface. For example, an administrator using the computer 110B may send a request for telemetry data measured over the past hour and the telemetry module 265 may send a response that includes the latency for the data packets processed in operations 510-560. The request for telemetry data may include a network address (e.g., in an IP header), and the sending of the telemetry data may include sending the telemetry data to the received network address. The operations 510-560 may be performed repeatedly prior to performance of the operations 570 and 580. Thus, the telemetry data generated and provided by the network device 200 may include latency information for multiple sets of data packets.

In alternative embodiments, NF delay is measured non-intrusively over a tunneling network, such as VxLan. Telemetry-related metadata can be collected along the data path and carried in a reserved VxLan packet tunnel header. In these example embodiments, the NF is connected with the specific tunnel and the NF supports the tunneling stack.

Using the method 500, telemetry data may be generated that includes the latency delay for an NF. In embodiments with multiple NFs, the method 500 may be performed for each NF. Alternatively or additionally, the method 500 may be performed for the plurality of NFs treated as a single function stack. Thus, operation 520 (storing the checksum values) is performed prior to providing the first plurality of data packets to the first NF of the stack, and operation 540 (receiving the data packets generated by the NF) is performed in response to receiving the data packets from the last NF of the stack. In this way, the total latency of all NFs in the network device is determined.

Figure 6:
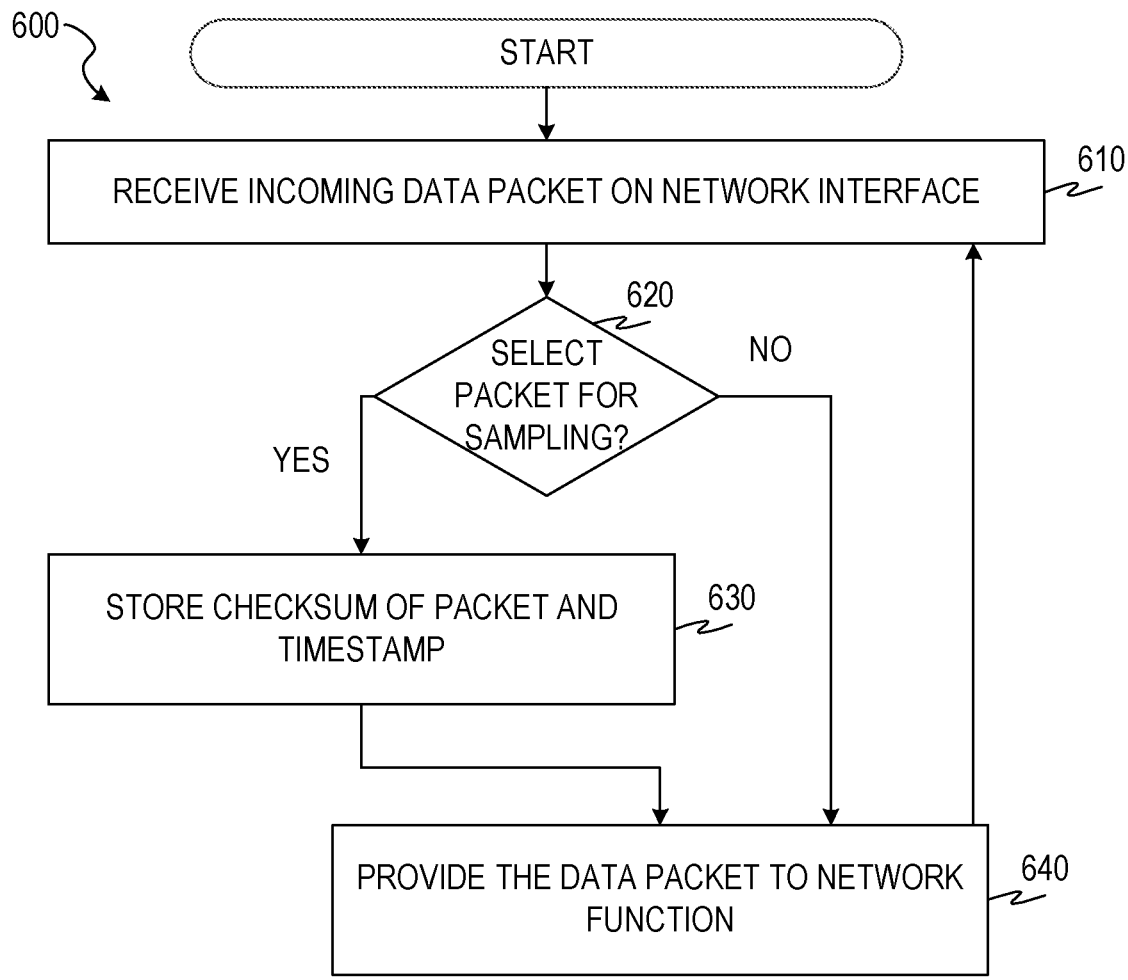
FIG. 6 is a flowchart illustration of a method of non-intrusively measuring a network function packet processing delay, according to some example embodiments.

FIG. 6 is a flowchart illustration of a method 600 of non-intrusively measuring a network function packet processing delay, according to some example embodiments. The method 600 includes operations 610, 620, 630, and 640. By way of example and not limitation, the method 600 is described as being performed by elements of the network organization 100, described above with respect to FIG. 1, and the network device 200, described above with respect to FIG. 2.

In operation 610, the communication interface 235 of the network device 200 receives an incoming data packet on a network interface and provides the data packet to the telemetry module 265.

In operation 620, the telemetry module 265 determines if the received data packet is selected for sampling. For example, a sequence of three packets may be selected for every 1000 received data packets. Accordingly, the telemetry module 265 may use a counter to track the number of received data packets since the last sample and select packets 1, 2, and 3 for sampling, resetting the counter when it reaches 1000.

If the data packet is selected in operation 620, the telemetry module 265 stores the checksum of the data packet and a timestamp (operation 630).

Otherwise, the method 600 continues with operation 640. In operation 640, the NF module 260 provides the data packet to an NF and the method 600 continues with operation 610. Thus, the method 600 enables the network device 200 to direct packets to an NF while selectively storing telemetry data for a subset of the incoming data packets.

Figure 7:
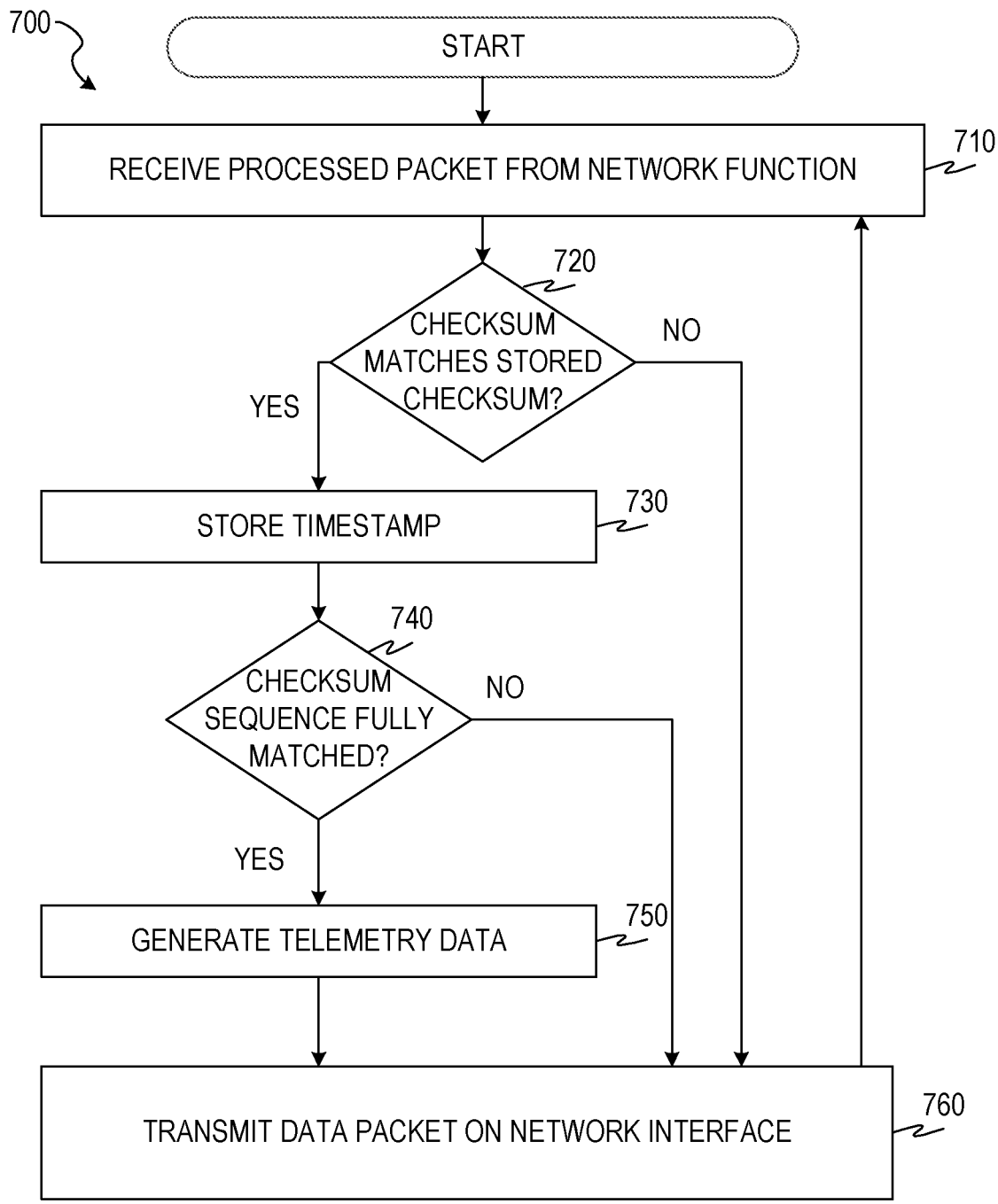
FIG. 7 is a flowchart illustration of a method of non-intrusively measuring a network function packet processing delay, according to some example embodiments.

FIG. 7 is a flowchart illustration of a method 700 of non-intrusively measuring a network function packet processing delay, according to some example embodiments. The method 700 includes operations 710, 720, 730, 740, 750, and 760. By way of example and not limitation, the method 700 is described as being performed by elements of the network organization 100, described above with respect to FIG. 1, and the network device 200, described above with respect to FIG. 2.

In operation 710, the NF module 260 of the network device 200 receives a processed packet from a network function. For example, the processed packet may be a packet produced by a network function invoked in operation 640 of the method 600.

In operation 720, the telemetry module 265 of the network device 200 determines whether a checksum of the received packet matches a stored checksum. For example, if the received packet is the first received packet (e.g., since power-on of the network device 200) or if the previous packet did not match a stored checksum, the checksum of the received packet may be compared to the first checksum of a stored checksum sequence (e.g., the checksum of the row 440A of FIG. 4). As another example, if the checksum of the previous packet matched the first checksum of the stored checksum sequence, the checksum of the received packet may be compared to the second checksum of the stored checksum sequence (e.g., the checksum of the row 440B of FIG. 4). Stated another way, if the checksum of the data packet matches the currently-considered stored checksum, the index of the currently-considered stored checksum is incremented. In this way, the checksums of sequential processed packets may be compared to the sequence of stored checksums. If the checksum does not match, the index may be reset and the method 700 continues with the operation 760.

In some example embodiments, in response to detecting that the received packet's checksum does not match the stored checksum, the telemetry module 265 determines if the stored checksum values have expired. For example, the current time may be compared to the timestamp of the row 440A to determine the time elapsed since the row 440A was stored. If the time elapsed exceeds a predetermined amount of time (e.g., 100 ms), the stored checksum value has expired and the telemetry module 265 generates telemetry data that indicates that the packets were provided to the NF but not received back. In some example embodiments, a count of lost data packets (i.e., packets provided to the NF but not received back) may be kept, and if the count of lost data packets exceeds a threshold, an alert to an administrator may be generated. The data for the lost packets may be removed from the telemetry table 400.

In operation 730, the telemetry module 265 stores a current timestamp if the compared checksums matched in operation 720. For example, the ingress timestamp field 430 value in the row 440A may be set to the current timestamp when the first checksum of the three-checksum sequence is matched.

In operation 740, the telemetry module 265 determines if the checksum sequence is fully matched. For example, if the third checksum of a three-checksum sequence is matched, the checksum sequence is fully matched. In that case, the telemetry module 265 generates, in operation 750, telemetry data. For example, a difference between the egress time of the last packet of the sequence and the ingress time of the last packet of the sequence may be calculated to determine the latency of the network function in processing the last packet. As another example, the latency of the network function may be determined as the mean latency of each packet in the sequence.

In operation 760, the received data packet is transmitted on a network interface (e.g., via the communication interface 235). Thus, by use of the methods 600 and 700 in combination, data packets are received on a network interface, checksum data for some data packets is stored, the data packets are processed by a network function, telemetry data is generated, and the data packets are sent to their destinations on the network. As a result, telemetry data is generated without interfering in the ordinary network traffic.

Figure 8:
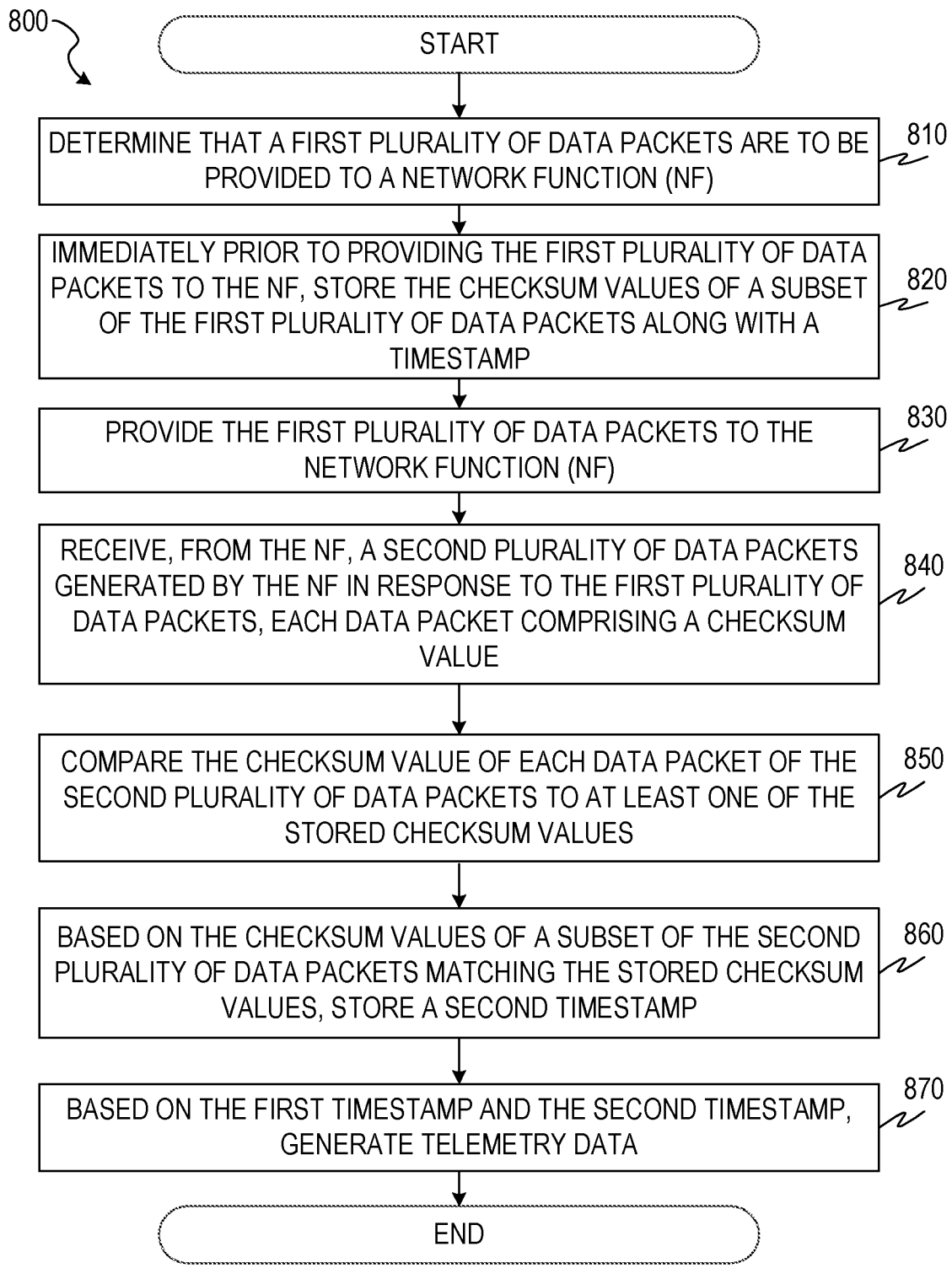
FIG. 8 is a flowchart illustration of a method of non-intrusively measuring a network function packet processing delay, according to some example embodiments.

FIG. 8 is a flowchart illustration of a method 800 of non-intrusively measuring a network function packet processing delay, according to some example embodiments. The method 800 includes operations 810, 820, 830, 840, 850, 860, and 870. By way of example and not limitation, the method 800 is described as being performed by elements of the network organization 100, described above with respect to FIG. 1, and the network device 200, described above with respect to FIG. 2. The method 800 may be used in place of the operations 520-570 of the method 500.

In operation 810, the telemetry module 265 of the network device 200 determines that a first plurality of data packets are to be provided to an NF. For example, the tunnel header 310 of each data packet may be checked to identify a user who produced the data packet. The identified user may be compared to a list of users being monitored by an NF and, if a match is found, the data packet is determined to be provided to the NF.

In operation 820, the telemetry module 265 of the network device 200 stores, immediately prior to providing the first plurality of data packets to the NF, the checksum values of a subset of the first plurality of data packets along with a timestamp. For example, the checksum value and timestamp for a data packet may be stored, after processing for receiving the data packet and determining that the data packet is to be provided to the NF are complete.

In operation 830, the NF module 260 of the network device 200 provides the first plurality of data packets to the NF. For example, the NF 140A of the router 130A may be invoked for each data packet in the first plurality of data packets.

In operation 840, the NF module 260 of the network device 200 receives, from the NF, a second plurality of data packets generated by the NF in response to the first plurality of data packets. Each received data packet comprises a checksum value.

In operation 850, the telemetry module 265 of the network device 200 compares the checksum value of each data packet of the second plurality of data packets to at least one of the stored checksum values. For example, the checksum value of the row 440A may be compared to the checksum value of each data packet until a match is found.

In operation 860, based on the checksum values of a subset of the second plurality of data packets matching the stored checksum values, the telemetry module 265 of the network device 200 stores a second timestamp. For example, the rows 440A-440C may be updated to add values in the ingress timestamp field 430 that indicate the time at which the subset of the second plurality of data packets were received by the network device from the NF. The telemetry module 265 of the network device 200 generates telemetry data based on the first timestamp and the second timestamp (in operation 870).

Figure 9:
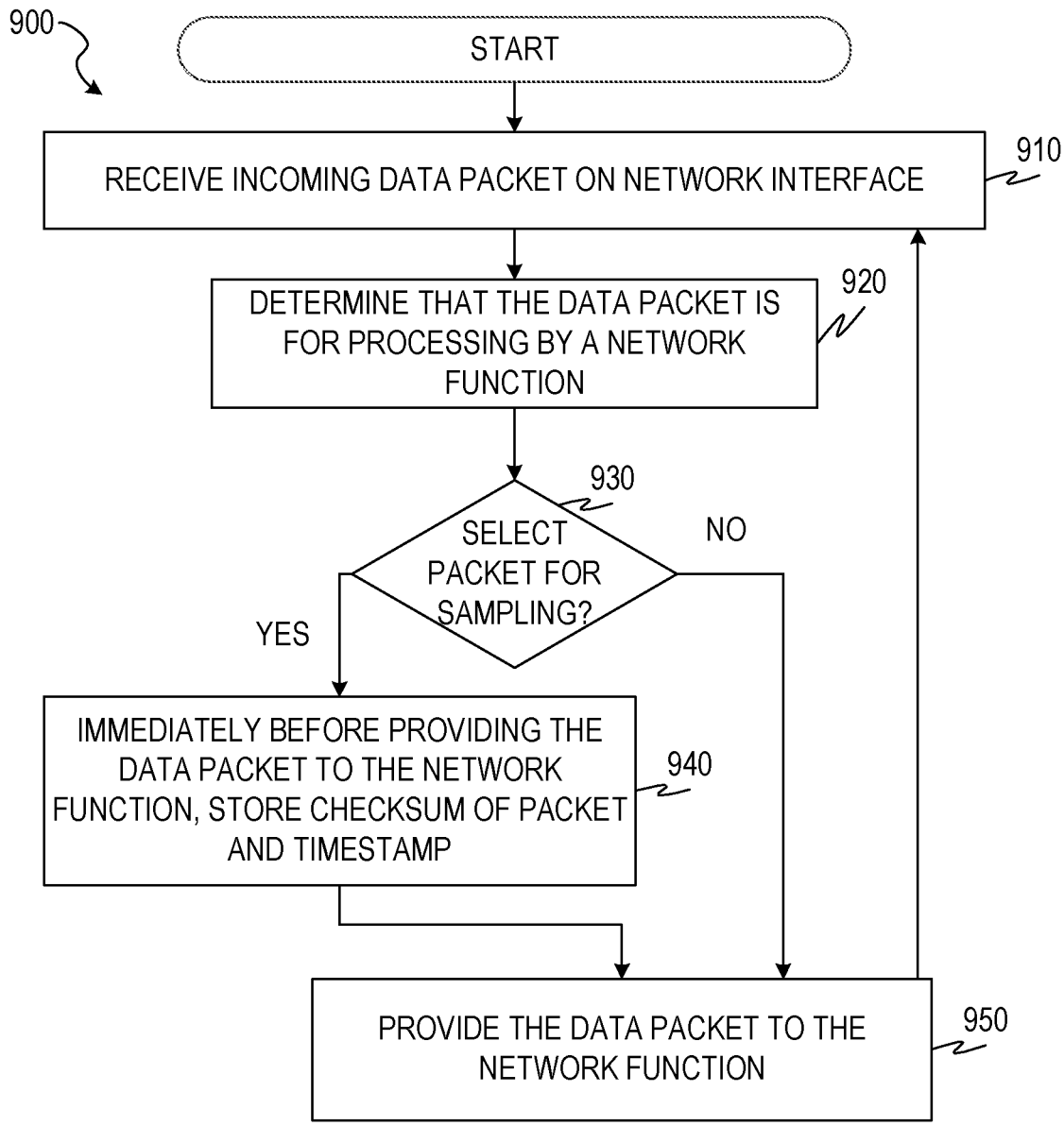
FIG. 9 is a flowchart illustration of a method of non-intrusively measuring a network function packet processing delay, according to some example embodiments.

FIG. 9 is a flowchart illustration of a method 900 of non-intrusively measuring a network function packet processing delay, according to some example embodiments. The method 900 includes operations 910, 920, 930, 940, and 950. By way of example and not limitation, the method 900 is described as being performed by elements of the network organization 100, described above with respect to FIG. 1, and the network device 200, described above with respect to FIG. 2. The method 900 may be used in place of the method 600.

In operation 910, the communication interface 235 of the network device 200 receives an incoming data packet on a network interface and provides the data packet to the telemetry module 265. The telemetry module 265, in operation 920, determines that the data packet is for processing by a network function. For example, the tunnel header 310 of each data packet may be checked to identify a user who produced the data packet. The identified user may be compared to a list of users being monitored by an NF and, if a match is found, the data packet is determined to be provided to the NF.

In operation 930, the telemetry module 265 determines if the received data packet is selected for sampling. For example, a sequence of three packets may be selected for every 1000 received data packets. Accordingly, the telemetry module 265 may use a counter to track the number of received data packets since the last sample and select packets 1, 2, and 3 for sampling, resetting the counter when it reaches 1000.

If the data packet is selected in operation 930, the telemetry module 265 stores, immediately before providing the data packet to the NF, the checksum of the data packet and a timestamp (operation 940). Storing the timestamp immediately prior to providing the data packet to the NF minimizes the delay between storing the timestamp and processing the data packet by the NF. Accordingly, the accuracy of a delay calculation based on the timestamp is increased.

If the data packet is not selected in operation 930 (or after the storing of the timestamp is complete in operation 940), the method 900 continues with operation 950. In operation 950, the NF module 260 provides the data packet to an NF and the method 900 continues with operation 910. Thus, the method 900 enables the network device 200 to direct packets to an NF while selectively storing telemetry data for a subset of the incoming data packets.

Figure 10:
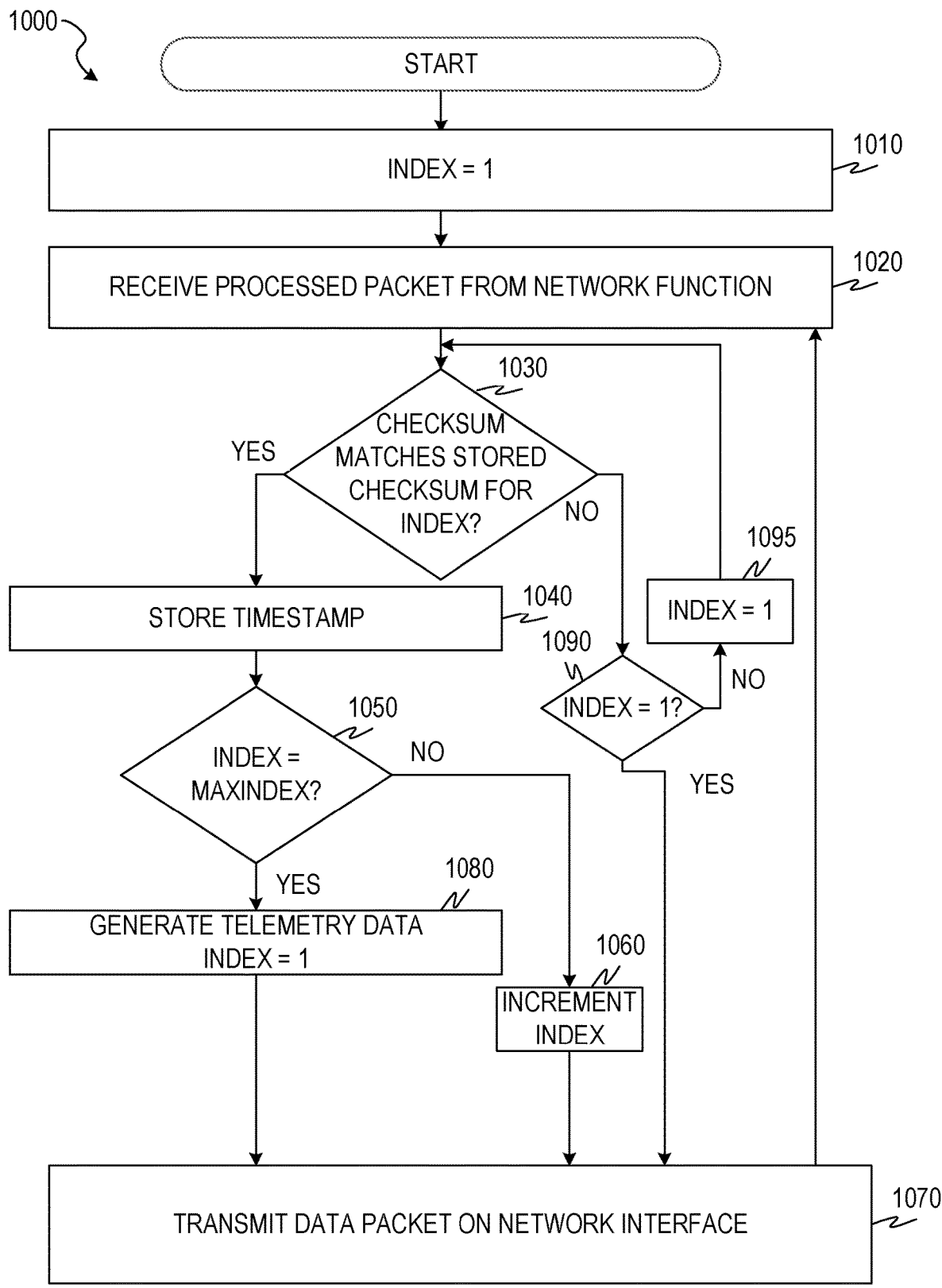
FIG. 10 is a flowchart illustration of a method of non-intrusively measuring a network function packet processing delay, according to some example embodiments.

FIG. 10 is a flowchart illustration of a method 1000 of non-intrusively measuring a network function packet processing delay, according to some example embodiments. The method 1000 includes operations 1010, 1020, 1030, 1040, 1050, 1060, 1070, 1080, 1090, and 1095. By way of example and not limitation, the method 1000 is described as being performed by elements of the network organization 100, described above with respect to FIG. 1, and the network device 200, described above with respect to FIG. 2. The method 1000 may be performed in place of the method 700.

In operation 1010, an index value is initialized to 1. In operation 1020, the NF module 260 of the network device 200 receives a processed packet from a network function. For example, the processed packet may be a packet produced by a network function invoked in operation 950 of the method 900.

In operation 1030, the telemetry module 265 of the network device 200 determines whether a checksum of the received packet matches a stored checksum corresponding to the index. For example, if the index is 1, the checksum of the received packet may be compared to the first checksum of a stored checksum sequence (e.g., the checksum of the row 440A of FIG. 4). As another example, if the index is 2, the checksum of the received packet may be compared to the second checksum of the stored checksum sequence (e.g., the checksum of the row 440B of FIG. 4). If the checksum matches, the method 1000 continues with operation 1040. If the checksum does not match, the method 1000 continues with operation 1090, discussed below.

In operation 1040, the telemetry module 265 stores a current timestamp if the compared checksums matched in operation 1030. For example, the ingress timestamp field 430 value in the row 440A may be set to the current timestamp when the first checksum of the three-checksum sequence is matched.

In operation 1050, the telemetry module 265 determines if the index value is equal to a maximum index value (e.g., 3 for a three-checksum sequence). For example, if the third checksum of a three-checksum sequence is matched, the checksum sequence is fully matched. In that case, the telemetry module 265 generates, in operation 1080, telemetry data and resets the index value to 1. For example, a difference between the ingress time of the last packet of the sequence and the egress time of the last packet of the sequence may be calculated to determine the latency of the network function in processing the last packet. As another example, the latency of the network function may be determined as the mean latency of each packet in the sequence. Alternatively, in operation 1060, if the index value was not equal to the maximum index value in operation 1050, the index value is incremented (e.g., from 1 to 2).

In some example embodiments, the latency of the NF is compared to a predetermined threshold and, if the predetermined threshold is exceeded, corrective action is taken. For example, the network device 200 may start an additional virtual machine (VM) to run an additional copy of the NF.

In operation 1070, the received data packet is transmitted on a network interface (e.g., via the communication interface 235). After operation 1070, the method 1000 returns to operation 1020.

When the checksum does not match the stored checksum for the index in operation 1030, the current value of the index is checked in operation 1090. If the index value is 1, the data packet is transmitted in operation 1070. However, if the index value is not 1, the index value is set to 1 in operation 1095, and the method 1000 returns to operation 1030. Thus, if a partial match of a sequence is found, the index is incremented (in operation 1060), and if the match fails to continue, the index is reset (in operation 1095).

Figure 11:
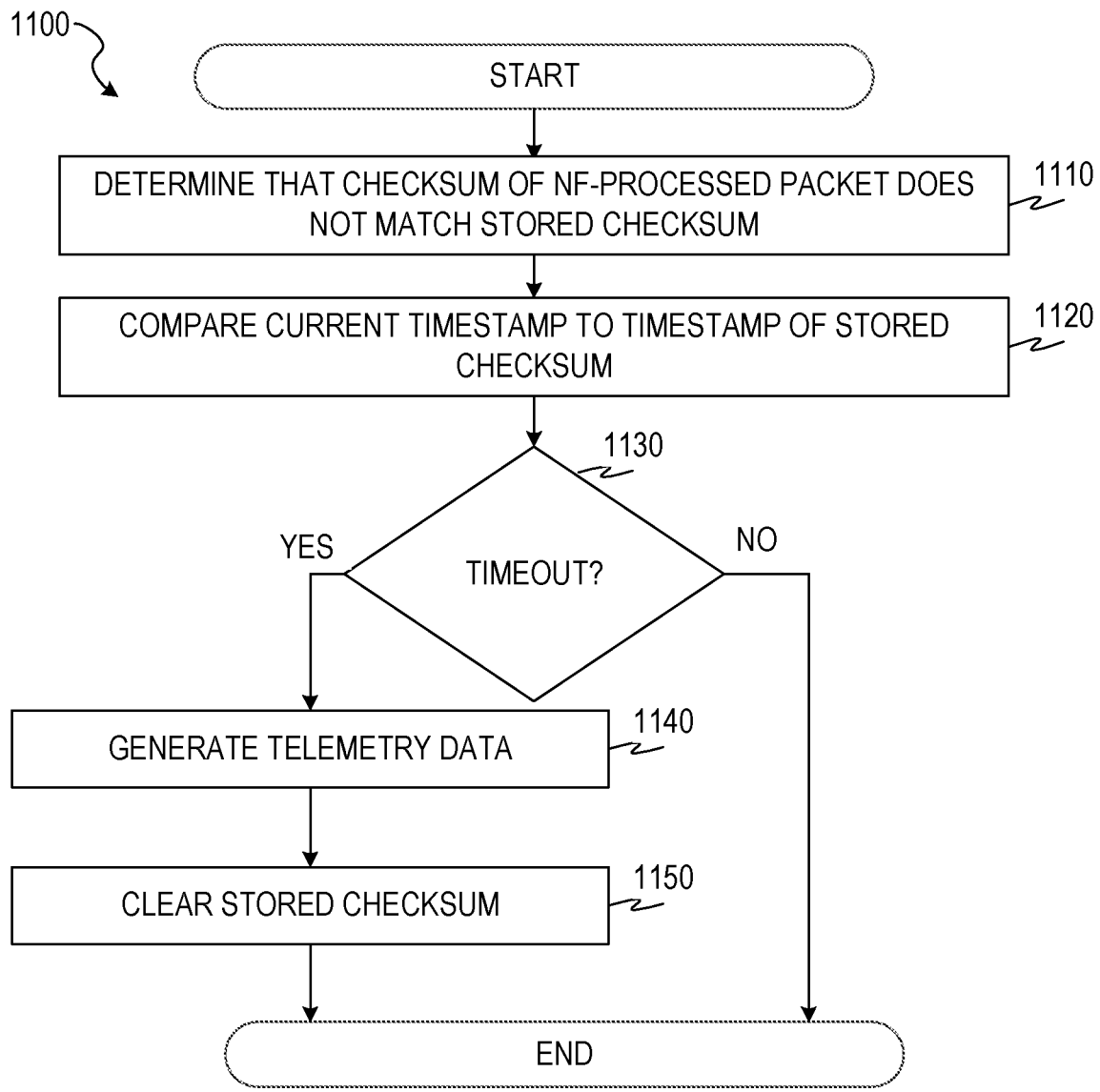
FIG. 11 is a flowchart illustration of a method of detecting errors while non-intrusively measuring a network function packet processing delay, according to some example embodiments.

FIG. 11 is a flowchart illustration of a method 1100 of detecting errors while non-intrusively measuring a network function packet processing delay, according to some example embodiments. The method 1100 includes operations 1110, 1120, 1130, 1140, and 1150. By way of example and not limitation, the method 1100 is described as being performed by elements of the network organization 100, described above with respect to FIG. 1, and the network device 200, described above with respect to FIG. 2. The method 1100 may be performed in addition to or instead of the operation 1090 of the method 1000.

In operation 1110, the telemetry module 265 determines that a checksum of an NF-processed packet does not match a stored checksum. For example, after operations 1030 and 1090 of the method 1000, the telemetry module 265 may have determined that the checksum of a data packet processed by an NF does not match either the current index or the first index of the stored checksums.

In operation 1120, the telemetry module 265 compares a current timestamp to a timestamp of a stored checksum. For example, the ingress timestamp field 430 of the rows 440A-440C may be empty because no ingress data has yet been received, and the current timestamp (e.g., 2017-09-28 10:03.5) may be compared to the egress timestamp field 420 of the row 440A (e.g., 2017-09-28 10:03.3378) to determine an elapsed time (e.g., 0.1622 seconds).

In operation 1130, the telemetry module 265 determines if a timeout has occurred. For example, the determined elapsed time may be compared to a predetermined threshold (e.g., 0.1 s) to determine if the elapsed time exceeds the threshold. If a timeout has not occurred, the method 1100 ends. For example, the method 1000 may continue with operation 1070.

If a timeout has occurred, the method 1100 continues with operation 1140, generating telemetry data. For example, telemetry data that indicates that the received data packets were dropped by the NF at the current time may be generated. In some example embodiments, the telemetry data generated in operation 1140 is proactively communicated to an administrator (e.g., via a network connection). The proactive communication may be based on a comparison of a number of dropped packets to a predetermined threshold (e.g., generating an alert when nine sequential stored checksums are not matched without timeout), a comparison of a rate of dropped packets to a predetermined threshold (e.g., generating an alert when 1% of stored checksums are not matched without timeout), or any suitable combination thereof. In other example embodiments, the telemetry data generated in operation 1140 is provided upon request, as described with respect to operation 580 of the method 500.

In operation 1150, the telemetry module 265 clears the stored checksums for the data packets that have timed out. For example, the rows 440A-440C may be removed from the telemetry table 400. Alternatively, an additional field may be added to the telemetry table 400 that indicates when processing of each record is complete.

By use of the method 1100 in conjunction with the method 1000, telemetry data showing successful NF processing of data packets is generated for data packets that are received from a network function within a timeout period, and telemetry data showing data packets dropped by the NF is generated for data packets that are not received from the network function within the timeout period. This may improve the quality of the telemetry data by ensuring that dropped packets are not waited for indefinitely, and reduce the probability of erroneously matching data packets output from the NF with data packets input to the NF. For example, given a long enough time period (e.g., 1 hour) at a high enough data rate (e.g., 5 Gbps), the probability of randomly matching 3 sequential 16-bit checksums becomes significant.

Devices and methods disclosed herein may reduce time, processor cycles, and power consumed in generating telemetry data for network functions. For example, network devices using disclosed methods may process fewer data packets in generating telemetry data and thus consume less power than prior-art systems (e.g., by requiring fewer processor cycles). Devices and methods disclosed herein may also result in an improved network function monitoring system, resulting in improved efficiency and an improved user experience.

Although a few embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or removed from, the described systems. Other embodiments may be within the scope of the following claims.

What is claimed is:

1. A network device comprising:
   a memory storage comprising instructions; and
   one or more processors in communication with the memory, wherein the one or more processors execute the instructions to perform operations comprising:
      receiving a first plurality of data packets, each data packet of the first plurality of data packets including a checksum value, and storing the checksum values of a subset of the first plurality of data packets along with a first timestamp;
      providing the first plurality of data packets to a network function (NF);
      receiving, from the NF, a second plurality of data packets generated by the NF in response to the first plurality of data packets, each data packet of the second plurality of data packets including a checksum value;
      storing a second timestamp when checksum values of a subset of the second plurality of data packets match the stored checksum values; and
      generating telemetry data based on the first timestamp and the second timestamp.

2. The network device of claim 1, wherein:
   the network device further comprises a network interface in communication with the one or more processors; and
   the one or more processors further execute the instructions to perform receiving, via the network interface, the first plurality of data packets, each data packet of the first plurality of data packets including a corresponding checksum value.

3. The network device of claim 1, wherein:
   the network device further comprises a network interface in communication with the one or more processors; and
   the one or more processors further execute the instructions to transmit the telemetry data via the network interface.

4. The network device of claim 3, wherein:
   the operations further comprise:
      receiving a network address to send the telemetry data to; and
      the sending of the telemetry data via the network interface comprises sending the telemetry data to the received network address.

5. The network device of claim 1, wherein the subset of the first plurality of data packets is a sequential subset of a predetermined number of data packets.

6. The network device of claim 5, wherein the predetermined number of data packets is three data packets.

7. The network device of claim 5, wherein the operations further comprise:
   determining the predetermined number of data packets based on a network speed of a network connected to the network device via a network interface.

8. The network device of claim 1, wherein the NF is a virtual network function (VNF).

9. The network device of claim 1, wherein the operations further comprise:
   selecting the subset of the first plurality of data packets based on a predetermined sampling rate.

10. The network device of claim 1, wherein the operations further comprise:
    selecting the subset of the first plurality of data packets based on a predetermined sampling size.

11. The network device of claim 1, wherein the operations further comprise:
    selecting the subset of the first plurality of data packets based on a predetermined sampling time.

12. The network device of claim 1, wherein:
    the telemetry data comprises a latency of the NF, and
    the operations further comprise:
       based on the latency of the NF and a predetermined threshold, starting a virtual machine to run an additional copy of the NF.

13. A computer-implemented method of non-intrusively measuring network function (NF) packet processing delay, comprising:
    receiving, by one or more processors of a network device, a first plurality of data packets, each data packet of the first plurality of data packets including a checksum value, and storing the checksum values of a subset of the first plurality of data packets along with a first timestamp;
    providing, by the one or more processors, the first plurality of data packets to an NE;
    receiving, by the one or more processors and from a network function (NF), a second plurality of data packets generated by the NF in response to the first plurality of data packets, each data packet of the second plurality of data packets including a checksum value;
    storing, by the one or more processors, a second timestamp when checksum values of a subset of the second plurality of data packets match the stored checksum values; and
    generating, by the one or more processors, telemetry data based on the first timestamp and the second timestamp.

14. The method of claim 13, further comprising receiving, via a network interface, the first plurality of data packets, each data packet of the first plurality of data packets including a corresponding checksum value.

15. The method of claim 13, further comprising transmitting the telemetry data via a network interface.

16. The method of claim 15, further comprising:
    receiving a network address to send the telemetry data to; and
    wherein the sending of the telemetry data via the network interface comprises sending the telemetry data to the received network address.

17. The method of claim 13, wherein the subset of the first plurality of data packets is a sequential subset of a predetermined number of data packets.

18. The method of claim 17, wherein the predetermined number of data packets is three data packets.

19. The method of claim 17, further comprising:
determining the predetermined number of data packets based on a network speed of a network connected to the network device via a network interface.

20. The method of claim 13, wherein the NF is a virtual network function (VNF).

21. The method of claim 13, further comprising:
selecting the subset of the first plurality of data packets based on a predetermined sampling rate.

22. The method of claim 13, further comprising:
selecting the subset of the first plurality of data packets based on a predetermined sampling size.

23. The method of claim 13, further comprising:
selecting the subset of the first plurality of data packets based on a predetermined sampling time.

24. The method of claim 13, wherein:
the telemetry data comprises a latency of the NF; and
the method further comprises:
based on the latency of the NF and a predetermined threshold, starting a virtual machine to run an additional copy of the NF.

25. A non-transitory computer-readable medium storing computer instructions for non-intrusively measuring network function (NF) packet processing delay, that when executed by one or more processors of a network device, cause the one or more processors to perform steps of:
receiving a first plurality of data packets, each data packet of the first plurality of data packets including a checksum value, and storing the checksum values of a subset of the first plurality of data packets along with a first timestamp;
providing the first plurality of data packets to an NF;
receiving, from the NF, a second plurality of data packets generated by the NF in response to the first plurality of data packets, each data packet of the second plurality of data packets including a checksum value;
storing a second timestamp when checksum values of a subset of the second plurality of data packets match the stored checksum values; and
generating telemetry data based on the first timestamp and the second timestamp.

* * * * *

UNITED STATES PATENT AND TRADEMARK OFFICE
CERTIFICATE OF CORRECTION

PATENT NO. : 10,742,532 B2
APPLICATION NO. : 15/845163
DATED : August 11, 2020
INVENTOR(S) : Tang et al.

Page 1 of 1

It is certified that error appears in the above-identified patent and that said Letters Patent is hereby corrected as shown below:

In the Claims

In Column 18, Line 26, in Claim 12, delete "NF," and insert --NF;-- therefor

In Column 18, Line 41, in Claim 12, delete "NE;" and insert --NF;-- therefor

Signed and Sealed this
Twenty-ninth Day of September, 2020

Andrei Iancu
*Director of the United States Patent and Trademark Office*